US005720009A

United States Patent [19]
Kirk et al.

[11] Patent Number: 5,720,009
[45] Date of Patent: Feb. 17, 1998

[54] METHOD OF RULE EXECUTION IN AN EXPERT SYSTEM USING EQUIVALENCE CLASSES TO GROUP DATABASE OBJECTS

[75] Inventors: Steven A. Kirk, Chelmsford; William Barabash, Acton; William S. Yerazunis, Marlboro, all of Mass.

[73] Assignee: Digital Equipment Corporation, Maynard, Mass.

[21] Appl. No.: 735,153

[22] Filed: Oct. 24, 1996

Related U.S. Application Data

[63] Continuation of Ser. No. 104,030, filed as PCT/US91/09205, Dec. 9, 1991, abandoned.
[51] Int. Cl.$^6$ .................................................. G06F 17/00
[52] U.S. Cl. ............................... 395/64; 395/62; 395/63
[58] Field of Search ........................ 395/50–51, 60–62, 395/64, 600, 650, 76–77

[56] References Cited

U.S. PATENT DOCUMENTS

| | | | |
|---|---|---|---|
| 4,823,306 | 4/1989 | Barbic et al. | 395/600 |
| 4,829,450 | 5/1989 | Manthey | 395/60 |
| 4,837,735 | 6/1989 | Allen, Jr. et al. | 364/513 |
| 4,849,905 | 7/1989 | Loeb et al. | 364/513 |
| 4,866,635 | 9/1989 | Kahn et al. | 395/51 |
| 4,928,236 | 5/1990 | Tanaka et al. | 364/513 |
| 4,937,755 | 6/1990 | Yokota et al. | 364/488 |
| 5,023,807 | 6/1991 | Ramakrishna et al. | 364/513 |
| 5,063,523 | 11/1991 | Vrenjak | 364/514 |
| 5,179,633 | 1/1993 | Barabash et al. | 395/64 |
| 5,263,127 | 11/1993 | Barabash et al. | 395/60 |
| 5,355,474 | 10/1994 | Thuraisngham et al. | 395/600 |

OTHER PUBLICATIONS

Neiman, "Adding the Rete Net to your OPS5 Toolbox," AI Expert, Jan. 1987, pp. 42–48.

Forgy, et al, "Rete: A Fast Match Algorithm," AI Expert, Jan. 1987, pp. 34–40.

Miranker, "TREAT: A Better Match Algorithm for AI Production Systems," Stanford Technical Reports, 1987, AI Architectures, pp. 42–47.

Miraker, et al, "On the Performance of Lazy Matching in Production Systems," AAAI-90 Proceedings, Eighth National Conference on Artificial Intelligence, 29 Jul.–3 Aug. 1990, Boston, Massachusetts, Knowledge Representation, pp. 685–692.

Proceedings. 7th IEEE Conference on Artificial Intelligence, vol. 19, Feb. 1991, Los Alamitos, California, Author: D. N. Gordin, Title: "Set–Oriented Constructs for Rule–Based Systems," pp. 76–80.

Yasdi, "Learning classification rules from database in the context of knowledge acquisition and representation"; IEEE Transactions on knowledge and data engineering, pp. 293–306, Sep. 1991.

Devedzic et al, "An architecture for real–time inference engines on personal computers"; Proceedings of the Twenty–Fifth Hawaii Interantioan Conferecne on System Sciences, pp. 619–630 vol. 1, 7–10 Jan. 1992.

(List continued on next page.)

*Primary Examiner*—Tariq R. Hafiz
*Attorney, Agent, or Firm*—Dirk Brinkman; Art Fisher; Michael A. Rodriguez

[57] ABSTRACT

A pattern match method is the primary component of any rule-based inference engine or database search method. Equivalence class projection is used in a discrimination match network, such that only equivalence class tokens (and not working memory objects) are propagated down the network, then only the first object which is a member of any specific equivalence class will cause an actual propagation down through the net. Subsequent changes which are either the creation of new objects which are members of a known equivalence class or the removal of any object but the last member of that equivalence class can totally avoid propagation downward in that section of the discrimination network.

2 Claims, 7 Drawing Sheets

OTHER PUBLICATIONS

Fukuda et al, "Expert system driven image processing for recognition and identification of micro–organisms"; MIV–89 Proceedings or the International Workshop on Industrial Applications of Machine Intelligence and Vision, pp. 33–38, 10–12 Apr. 1989.

Choi et al, "The manipulation of time–varying dynamic variables using the rule modification method and performance–index in npp accident diagnostic expert systems"; IEEE Transactions on Nuclear Science, pp. 1121–1125, vol. 35, iss. 5, Oct. 1988.

60

70 (SHIRT ^COLOR = <COL>)

72 (PANTS ^COLOR = <COL>)

65

74 (TIE ^COLOR = <COL>)

76 (SOCKS ^COLOR = <COL>)

⟶ (ACTION LIST) 80   78

PRIOR ART

FIG.2

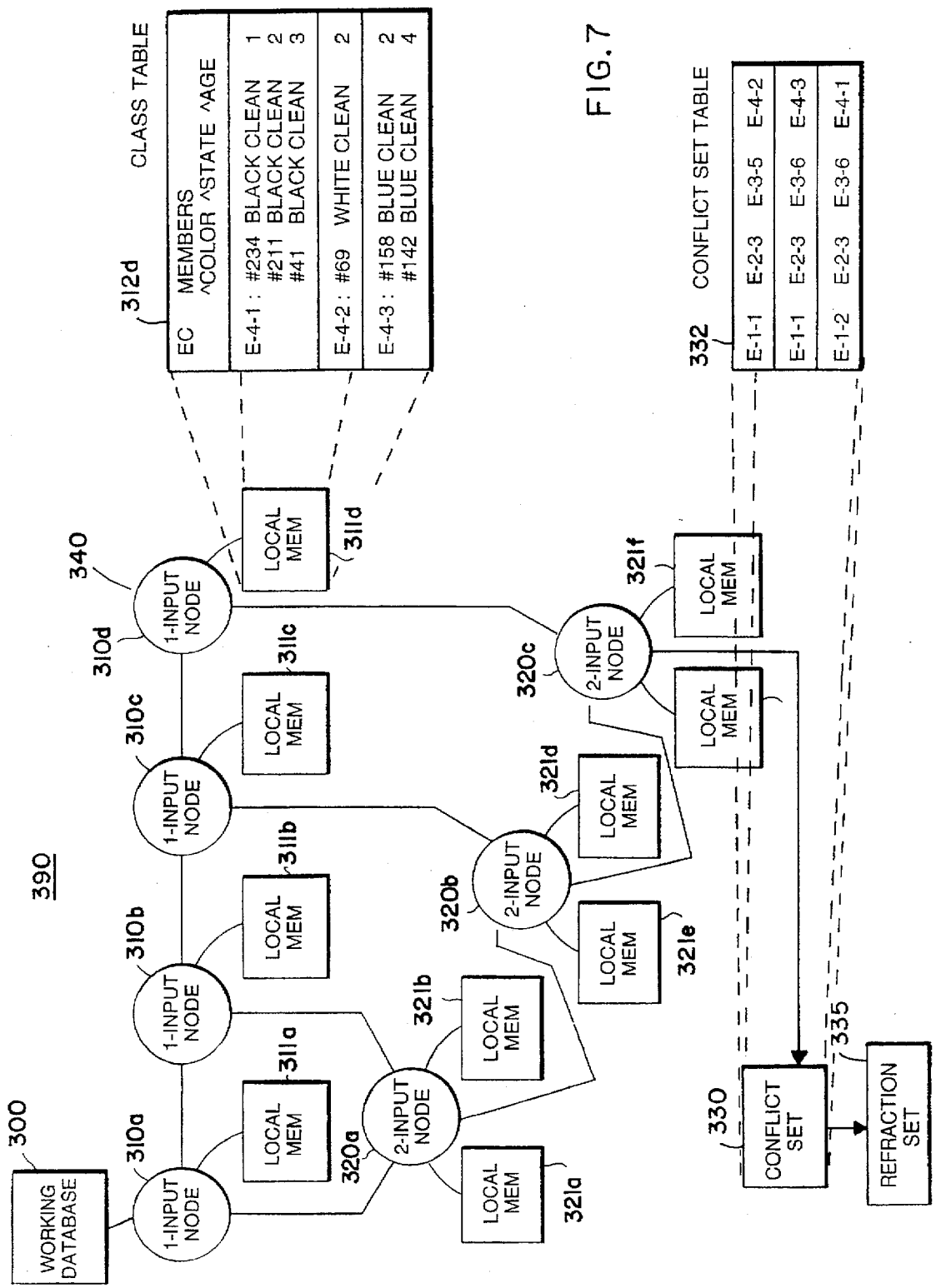

METHOD OF RULE EXECUTION IN AN EXPERT SYSTEM USING EQUIVALENCE CLASSES TO GROUP DATABASE OBJECTS

This application is a continuation of application Ser. No. 08/104,030 filed as PCT/US91/09205, Dec. 9, 1991, now abandoned.

BACKGROUND OF THE INVENTION

This invention relates to pattern matching, such as arises in complex data base systems, and more specifically, in rule-based artificial intelligence systems (i.e., so-called "expert systems") in which the various conditions defined by the rules are structured as a network to allow efficient determination of which rules are applicable to data obtained by the system.

An expert system is based on a computer program which comprises a set of rules and definitions of types of data that will be processed according to the rules. By a process known as "inference", the system performs matching between conditions set forth in the set of rules and data elements of the defined types in a working data base that has been obtained by the system from a user or from other data bases. When a set of data elements satisfies the conditions in one or more of the rules, one of more of the satisfied rules are "fired" (i.e., applied to the data) to change the data elements in the working data base provide advice to the user or explanations in response to the user's questions, or to take some other action. The inference process is repeated until no rules are found to be satisfied by the data, or the firing of a rule indicates that the inference process is to stop.

In general, the inference process can be thought of as attempting to evaluate a set of objects (all the data elements in the working data base) in light of a preexisting set of constraints (the conditions in the rule) to find a tuple of objects which satisfy the set of constraints (the combination of data elements which satisfy the rule).

Each rule includes one or more conditions (collectively referred to as the "left-hand side" of the rule) which, if satisfied by the data, indicate that the rule is applicable. After the conditions of the rules are evaluated to determine which rules are applicable, one or more of the applicable rules is fired. The operations to be performed when the rule is fired are listed in the "right-hand side" of the rule. One way to determine which rules are applicable is to test every condition in the left hand sides of all the rules each time a new element of data is obtained by the system. With this scheme, each condition is retested each time the working data base is altered by addition or deletion of data, even if the altered data could not possibly have changed the result of that condition.

It is known that during operation of an expert system the largest proportion of time is spent in evaluating the conditions in the rules to determine which rules are applicable. Thus, to improve the performance of expert systems, it is necessary to minimize the amount of time spent in evaluating the conditions in the rules.

One approach taken to minimize condition evaluation time uses a TREAT-net, which is fully described by Daniel Miranker in *TREAT: A New and Efficient Match Algorithm for AI Production Systems* (Research Note in Artificial Intelligence - Morgan Kaufmann Publishers, Inc.). A TREAT-net is a data structure by which the conditions of all rules are evaluated in a network of nodes. The conditions of the rules are tested in select nodes (and their associated memories) that are interconnected by a set of join nodes to represent the various combinations of conditions that are specified in the left-hand sides of the rules. Tokens that represent data elements, or sets of data elements, in the working data base are passed via the interconnections of the nodes through the TREAT-net as the data elements pass various tests and combinations of tests. The TREAT-net terminates at result nodes that correspond to respective individual rules. If the left-hand side of a rule is satisfied, the TREAT-net stores a token, representing the set of data elements which satisfy the condition of the rule, in the result node corresponding to that rule. The set of tokens supplied to the result node is known as a conflict set because it contains tokens representing all possible combinations of data elements satisfying the conditions.

Another approach taken to minimize the condition evaluation time in some expert systems has been to structure the left-hand sides of the rules as a "discrimination net", such a so-called "reticular" net or RETE-net. A RETE-net more efficiently determines which rules are applicable by testing, when the working data base is changed, only those conditions having results that may have changed in response to the changed data in the working data base.

A RETE-net, which is more fully described by Charles L. Forgy and Susan J. Shepard in *RETE: A fast match algorithm* (AI Expert, January 1987), consists of interconnected nodes, including a set of 1-input nodes (including associated memories) and a set of 2-input nodes (also including associated memories). Data may be thought of as being flowing through the RETE-net via the interconnections. Each node receives tokens representing data elements, or sets of data elements, from the working data base or from another node, processes the received data, and possibly generates other tokens representing data to be passed to another node through the interconnections. The 1-input nodes evaluate conditions relating to a single data element, and the 2-input nodes evaluate conditions concerning the relation between different data elements, or sets of different data elements. The RETE-net terminates at result nodes that correspond to respective individual rules. If the left-hand side of a rule is satisfied, the RETE-net stores a token, representing the data element, satisfying the conditions of that rule, in the result node corresponding to that rule. The tokens in the result node is known as a conflict set because it contains all the tokens representing the data elements which satisfy the conditions of the rule.

Operation of an expert system includes two steps, compilation and execution. Before compilation, a programmer generates an expert system source program, defining the rules and data definitions of the expert system. This source program is processed by a compiler to generate an executable program, and associated data structures, which can then be executed to perform the operations of the expert system. The data structures generated during compilation include a RETE-net or TREAT-net for evaluating the left-hand sides of the rules.

Before execution, the compiled executable program and associated data structures, including the RETE-net or TREAT-net for evaluating the left-hand sides of the rules, are loaded into a memory of a computer system. In addition, a portion of that memory is allocated to a working data base for containing actual data elements to be processed by the expert system. This computer system will perform the inference process, and is known as an inference engine. The executable program is then run by the inference engine to process the actual data elements in the working data base through the RETE-net or TREAT-net and actually perform the expert system functions.

FIG. 1 is a block diagram of a known computer system embodying an expert system including a RETE-net or TREAT-net. In FIG. 1, expert system 10 includes an expert system source program 12, and a compiler 10 which compiles the expert system source program 12 to generate an executable program (not shown) and associated data structures (described in more detail below). The expert system 10 may be created using any suitable expert system programming language (such as OPS5). Expert system source program 12 includes a set of programmer supplied data definitions 14 that identify classes of data which the expert system 10 will use during execution. During execution, memory will be allocated to a working data base for storing actual data elements defined by the data definitions 14. For example, if expert system source program 12 defines an expert system for giving advice concerning dressing people, data definitions 14 might include classes such as SHIRTS, PANTS, TIES and SOCKS.

Expert system source program 12 also includes a set of programmer supplied rules, identified by rule definitions 16, which describe the way in which actual data that fits the data definitions 14 will be manipulated by the expert system 10 during execution, and how expert system 10 will interact with the user and the rest of the computer system.

Expert system source program 12 may also include programmer defined links to other source programs 18 in other languages (such as C, FORTRAN, BASIC, etc.) for performing tasks, such as accessing remote databases or making statistical computations, when called upon during the execution of expert system 10. These other source programs 18 in other languages are compiled by respective compilers 22 for those other languages to generate respective executable programs and associated data structures.

The programmer supplied data definitions 14 and rule definitions 16 are compiled by compiler 20 and the resulting executable program and associated data structures stored in a portion (not shown) of memory 30 in an inference engine 24. In particular, section 26 of memory 30 is allocated to the RETE-net or TREAT-net representing the left-hand sides of the rule definitions 16, and section 34 of memory 30 is allocated to the working data base, which may store a plurality of actual data elements 36. The other programs 18 are compiled by their own compilers 22 and the executable programs and associated data structures are stored in other portions (not shown) of memory 30. A processor and controller 28 in inference engine 24 controls the operation of compilers 20 and 22 during compilation. Processor and controller 28 also executes the executable expert system program generated by compiler 20 and receives data from and sends data to a user through user interface 32 during execution.

FIG. 2 is textual diagram illustrating a known OPS5 source representation of a portion of a rule 60 which may be used in the expert system illustrated in FIG. 1. For rule 60 in FIG. 2, previously processed data definitions (not shown) have defined, in known manner, data classes: SHIRT, PANTS, TIE and SOCKS. Also in known manner, all of the data classes can have attributes (indicated by the prefix "^") associated with them. In FIG. 2, all the data classes have had the attribute ^COLOR associated with them. Attributes associated with a class are assigned a value, which may be tested by the conditions of the left-hand sides of rules in the expert system.

In rule 60, the left-hand side 65 consists of conditions on lines 70, 72, 74 and 76. Line 70 indicates that a data element of the SHIRT class must be present in the working data base 34 (of FIG. 1) for the rule to be satisfied. In addition, the value of the ^COLOR attribute of the SHIRT class data element is stored in a variable <COL> (denoted by a pair of brackets <...> enclosing the name of the variable). Lines 72 to 76 indicate that data elements of the PANTS class, TIE class and SOCKS class, respectively, must also be present, and, in accordance with the OPS5 language, the value of the ^COLOR attributes of the data elements of these classes must be the same as the value previously stored in the <COL> variable. (I.e. the ^COLOR attribute of the PANTS class, TIE class and SOCKS class data elements must all have the same value as the ^COLOR attribute of the SHIRT class data element).

The rule 60 is completely satisfied only if the data passes all tests 70, 72, 74, and 76. If rule 60 is completely satisfied, a token containing references to the four data elements which satisfy rule 60 is stored in a result node associated with rule 60.

Referring again to FIG. 2, the variable <COL> as used in line 70 can be differentiated from the variable <COL> as used in lines 72 to 74. The variable <COL> used in line 70 is known as a 'bound' variable. When an OPS5 variable is first used in a rule, the variable acts as a wildcard that matches and is assigned whatever value is in the attribute of the data element from the working database currently being tested. The first time a variable is matched to the value of an attribute of a data element in the working database, the value of that attribute is said to be bound to that variable. Any subsequent use of the same variable in that rule represents the previously bound value. As an example, if the value of the ^COLOR attribute of the SHIRT class data element is blue, then the variable <COL> as used in 70 is assigned the value blue. When the variable <COL> is used again in the rule 60, on either the left hand side 65 (as in lines 72 to 76) or the right hand side 78, it represents the value blue.

The variable <COL> as used in lines 72 to 76 is known as a 'tested' variable. A tested variable is one that has been previously referred to in a rule, and, thus, has had a value assigned to it. The value of the indicated attribute of the data element currently being tested is compared to the value previously assigned to the variable (at the first occurrence of that variable), and must be equal to it for consistency. Continuing the above example, if the variable 'COL' in line 70 was assigned a value of blue, then in lines 72 to 76 the respective values of the ^COLOR attributes of the PANTS class, TIE class and SOCKS class data element are all compared to the value of the variable <COL> and must equal it for consistency. That is, only if the values of the ^COLOR attributes of the PANTS class, TIE class and SOCKS class data elements are all blue are the conditions of lines 72 to 76 satisfied.

The right hand side 78 of the rule 60 contains an "action list" 80 (not shown in detail) that is executed if the rule is fired. For example, the firing of the rule might cause system 10 in FIG. 1 to obtain more data or compute the value of some data (for example, by executing one of other programs 18). A rule firing may also cause some external action to be taken (such as displaying data or changing an external database 38).

FIG. 3 is a data flow diagram of a known TREAT-net 190 corresponding to the conditions of rule 60 of FIG. 2. In FIG. 3, a working data base WDB node 100 supplies tokens representing all the data elements 36 in the working data base 34 (of FIG. 1) to the TREAT-net 190. These tokens are passed, unchanged, by TREAT-net 190 to a terminal node 140. Terminal node 140, may be coupled to subsequent select nodes (not shown) associated with other rules (also not shown). TREAT-net 190 evaluates the tokens from WDB node 100 and supplies a set of tokens containing references to data elements satisfying rule 60 to a result node 130 for rule 60. The tokens supplied to result node 190 represent the conflict set for rule 60.

In general, the conditions of lines 70 to 76 of rule 60 are evaluated by TREAT-net 190, in a known manner. In FIG. 3, the select nodes 110a–110d evaluate the portions of the conditions on lines 70–76, respectively, relating only to that condition. The join nodes 120a–120d evaluate the portions of the conditions on lines 70–76 related to respectively different conditions. The result of the tests performed in the join nodes 120a–120d are supplied to the result node 130.

Each select node (110a–110d) has a single input port (shown generally on the left side of the node) at which tokens representing data elements from the working data base are received. Each select node (110a–110d) also includes a pass-through port (shown generally on the right side of the node) from which all the tokens supplied to the input port of the node are passed to subsequent nodes in the TREAT-net 190 unchanged. Each select node (110a–110d) also has an output port (shown generally at the bottom of the node) from which tokens representing data elements satisfying the particular test implemented in that node are passed to subsequent nodes In the TREAT-net 190 (as will be described in more detail below). Finally, each select node 110a–110d has a respective local memory 111a–111d associated with it in which copies of tokens supplied to the output port are stored.

Each join node 120a–120d has an input port, shown generally on the top of the node, at which tokens from preceding select nodes are received. Each join node also includes interconnections ports shown generally on the sides of the node, for sending and receiving data packets representing sets of partially matched data tokens from one join node to another. For simplicity, interconnection ports are only illustrated for join nodes adjacent each other in FIG. 3. It is understood, however, that any join node may send or receive such data packets from any other. Each join node 120a–120d also has an output port, shown generally on the bottom of the node, from which tokens, representing combinations of data elements satisfying the rule, are supplied to the result node 130. In addition, each join node 120a–120d is interconnected to all the local memories 111a–111d of all the select nodes 110a–110d via ask data paths. However, only ask data paths 121a–121d for join node 120a are illustrated in order to simplify FIG. 3.

Specifically, TREAT-net 190 includes select nodes 110a–110d having serially coupled input and pass-through ports coupled between the WDB node 100 and terminal node 140. The output ports of select nodes 110a–110d are coupled to respective input ports of join nodes 120a–120d. Join nodes 120a–120d are all interconnected via their respective interconnection ports. The output ports of all of join nodes 120a–120d are coupled to the result node 130. Join node 120a has respective ask data paths 121a–121d coupled to all of the local memories 111a–111d of all the select nodes 110a–110d. Join nodes 120b–120d similarly have ask data paths (not shown) coupled to all of the local memories 111a–111d of all the select nodes 110a–110d.

In operation, select node 110a receives tokens from the WDB node 100 representing the data elements 36 stored in the working data base 34 (of FIG. 1) at its input port and passes them, unchanged, to the pass through port. Select node 110a corresponds to the condition on line 70 of FIG. 2 and evaluates the data element represented by each token to determine whether it is of the SHIRT class. If it is of the SHIRT class, that token is stored in the local memory 111a of select node 110a and passed to join node 121a via its output port. Select nodes 110b–110d operate in a similar manner to receive tokens at their respective input ports, pass these tokens, unchanged, to their respective pass through ports, and place tokens of the PANTS class, TIE class and SOCKS class, respectively, in their respective local memories (111b–111d) and pass those tokens to their respective output ports.

In combination, join nodes 120a–120d, in known manner, construct tokens representing combinations of data elements which satisfy the conditions of rule 60 of FIG. 2. When any one of join nodes 120a–120d receives a token, representing a data element, from its corresponding select node 110a–110d, a data packet is generated. The data packet consists of a list of records, each record containing a set of data element identifiers and an indication of the number of such identifiers contained in that record. That data packet is passed from join node to join node until each join node has been traversed. Data obtained from the ask lines 121a–121d is used to determine to which of the join nodes 120a–120d the packet is to be passed. For example, it is known to obtain the number of entries in each of the local memories in the other select nodes 110a–110d to determine which join node should next process the data packet.

When each join node receives the data packet, it sequentially compares the data elements referred to in each of the records in the data packet to the data elements referred to in the local memory of its corresponding select node to determine whether any combinations of data elements satisfy the tests performed by that join node. If any such combinations are found, a record for each is created in the data packet. The new record consists of the data element identifiers from the record from the data packet currently being tested, with an identifier for the matching data element from the local memory appended to it. The indicator of the number of data element identifiers in that record in then incremented.

When all join nodes have been traversed, the records in the data packet represent the combinations of data elements matching the rule. A token is generated representing each combination represented by each record in the data packet, and the generated tokens are passed to the result node 130 via the output port of the last join node traversed where they become part of the conflict set for rule 60.

Each token in the conflict set represents a set of data elements which, in combination, satisfy rule 60, and indicate that rule 60 is now available to fire by executing the action list 80 in the right hand side 78 of rule 60. The process of selecting a rule to fire, and the firing of that rule will be discussed in detail below.

FIG. 4 is a data flow diagram of a known RETE-net 290 corresponding to the conditions of rule 60 of FIG. 2. In FIG. 4, a working data base WDB node 200 supplies tokens representing all the data elements 36 in the working data base 34 (of FIG. 1) to the RETE-net 290. These tokens are passed, unchanged, by RETE-net 290 to a terminal node 240. Terminal node 240, may be coupled to subsequent RETE-net nodes (not shown) associated with other rules (also not shown). RETE-net 290 evaluates the tokens from WDB node 200 and supplies a set of tokens representing respective combinations of data elements satisfying rule 60 to a result node 230 for rule 60. The tokens supplied to result node 230 represent the conflict set for rule 60.

The conditions of rule 60 of FIG. 4 are represented in known manner by a network of 1-input nodes 210a–210d and 2-input nodes 220a–220c. The compiler 20 (of FIG. 1) generates the structure of RETE-net 290, in a known manner, in response to the data definitions 14 and rule definitions 16.

Each 1-input node (210a–210d) has a single input port (shown generally on the left hand side of the node) at which tokens representing data elements from the working data base are received; a pass-through port (shown generally on the right side of the node) from which all the tokens supplied to the node at the input port are passed to subsequent nodes in the RETE-net 290 unchanged; and an output port (shown generally at the bottom of the node) from which tokens representing data elements satisfying the particular test implemented in that node are passed to subsequent nodes in the RETE-net (as will be described in more detail below). Each 1-input node 210a–210d also has a respective memory 211a–211d associated with it The tests implemented in 1-input nodes (210a–210d) relate to single data elements from the working data base. In operation, each 1-input node performs, in known manner, its designated test on each token which is received at its input port. If the data represented by that token satisfies the test implemented in that node, that token is stored in the memory associated with the node and that token is passed through the output port to subsequent nodes in the RETE-net 180.

Each 2-input node (220a–220c) has a first, or left hand, input port (shown generally on the upper left side of the node) and a second, or right hand input port (shown generally on the upper right side of the node). The left hand input port receives tokens either representing data elements from the working data base satisfying tests implemented in preceding 1-input nodes (as in 2-input node 220a), or representing sets of data elements satisfying tests implemented by preceding 2-input nodes (as in 2-input nodes 220b and 220c). The right hand input port receives tokens representing data elements from the working data base satisfying tests implemented in preceding 1-input nodes. Each 2-input node (220a–220c) further includes an output port (shown generally on the bottom of the node) from which tokens representing sets of data elements satisfying the test implemented by that 2-input node (220a–220c) are passed to subsequent nodes in the RETE-net 290. Each 2-input node 220a–220c also has respective left memories 221a, 221c and 221e and respective right memories 221b, 221d and 221e associated with it.

The tests implemented in 2-input nodes (130a–130c) relate to the relationship between different data elements in the working data base. In general operation, each 2-input node, in known manner, stores each token received from the left hand input port in the left hand, and stores each token received from the right hand input port in the right hand memory. Whenever a token is received from either input port, the newly received token is stored in the corresponding memory. Then the data element or set of data elements represented by that newly received token are combined with the data elements represented by every token stored in the other memory. A token representing each such combination is then passed to the output port of that 2-input node. In general operation, therefore, a 2-input node will produce a set of tokens, termed the cross-product, representing the respective combinations of the data element or set of data elements contained in every token supplied to the left hand input port with the data elements from every token supplied to the right hand input port. The number of such tokens in this set is equal to the product of the number of tokens received at the first input port times the number of tokens received at the second input port.

However, the 2-input node may also perform a comparison between the different data elements represented by the newly received and the previously stored tokens. In such a case, only tokens representing those combinations of data elements which satisfy the condition tested for in the 2-input node will be included in the set of tokens passed to the output port of the 2-input node. For example, when a previously bound variable is tested in a subsequent condition, the value of the attribute of the data element referenced in the subsequent condition is compared to the value previously stored in the variable in the 2-input node. Only tokens representing combinations of data elements in which the values of the attribute and variable are the same are passed through the output port to subsequent sections of the RETE-net 290.

Specifically, RETE-net 290 is formed of 1-input nodes 210a–d having serially connected input and pass-through ports coupled between the WDB node 200 terminal node 240. Tokens representing all the data elements in the working data base pass through this path. The output ports of 1-input nodes 210a and 210b are interconnected by 2-input node 220a. The output ports of 2-input node 220a and 1-input node 210c are interconnected by 2-input node 220b. The output ports of 2-input node 220b and 1-input node 210d are interconnected by 2-input node 220c, and the output port of 2-input node 220c is coupled to result node 230.

In operation, by way of an example, assume that the working data base contains data elements of the SHIRT class (representing shirts), data elements of the PANTS class (representing pairs of pants), data elements of the TIE class (representing ties), and data elements of the SOCKS class (representing socks). Data elements of other classes (not shown or discussed below) may also be present in the working data base. Further assume that each data element of the SHIRT class, PANTS class, TIE class and SOCKS class has a ^COLOR attribute having a value (indicating the color of the represented item of clothing). These data elements may also have other attributes.

At 1-input node 210a tokens representing all the data elements in the working data base are passed from input port to pass-through port, but only those tokens representing shirts, i.e., the tokens referring to data elements of the SHIRT class, will be stored in the node memory 211a and passed through to the output port to continue through the RETE-net 290. In a similar manner, at 1-input nodes 210b–210d only tokens referring to data elements of the PANTS class, TIE class and SOCKS class, respectively, will be stored in the respective node memories 211b–211d and continue through the RETE-net 290.

At 2-input node 220a, the tokens from 1-input node 210a, containing references to SHIRT class data elements, are received at the left hand input port. These tokens are stored in the left hand memory 221a. As each token is received, the value of the ^COLOR attribute of the SHIRT class data element contained in that token is bound to the variable <COL>. Then each token stored in the right hand memory 221b, representing PANTS class data elements, is evaluated in the following manner. The value of the ^COLOR attribute of the PANTS class data element contained in the previously stored token in the right hand memory 221b is then compared to the value in the <COL> variable. If the values are the same, then a token referring to the combination of the matching two data elements is generated, and that token is passed to the output port of 2-input node 220a.

The tokens from 1-input node 210b, containing references to PANTS class data elements, are received at the right hand input port. These tokens are stored in the right hand memory 221b. As each token is received, it is compared to all the tokens previously stored in the left hand memory 221a in the following manner. The value of the ^COLOR attribute of the SHIRT class data element contained in each such previously stored token is bound to the variable <COL>. Then the value of the ^COLOR attribute of the PANTS class data element contained in the newly received token from the right hand input port is then compared to the value in the <COL> variable. If the values are the same, then a token referring to the combination of the matching two data elements is generated, and that token is passed to the output port of 2-input node 220a.

The 2-input nodes 220b and 220c operate in a similar manner: binding the variable <COL> to the value of ^COLOR attribute of the SHIRT class data element contained in each token either newly received from the left hand input port, or previously stored in the left hand memories 221c or 221e, respectively, and comparing the value of the <COL> variable with the value of the ^COLOR attribute of the TIE class or SOCKS class data element respectively contained in the token either previously stored in the right hand memory 221d or 221f, respectively, or newly received from the right hand input port. If the values are the same, then a token referring to the combination of the matching data elements is generated, and that token is passed to the output port of 2-input node 220b and 220c.

In either case, the amount of time spent by the TREAT-net or RETE-net in evaluating the data elements in the working data base typically takes a majority of the execution time of the expert system. It is desirable that the time spent in evaluating the data element in the working data base be minimized to improve the operation of such an expert system.

SUMMARY OF THE INVENTION

The inventors have realized that in the prior art TREAT-net or RETE-net implementations of rule based expert systems, at times many tokens may be passed through the network which, with respect to the rule being processed, are indistinguishable. Because these tokens are indistinguishable, processing of all these tokens by the TREAT-net or RETE-net corresponding to this rule is unnecessary, and results in unnecessary time being spent in condition evaluation. If tokens representing data elements which are indistinguishable with respect to the rule being evaluated are grouped into one class, termed an equivalence class, and a single token representing that equivalence class is passed through the TREAT-net or RETE-net (instead of all the separate tokens), then processing time can be minimized and performance of the expert system optimized.

In the above example, the working data base may contain many tokens containing SHIRT class data elements having the same value for the ^COLOR attribute. This could be because other attributes (not shown) have different values (a blue dress shirt and a blue flannel shirt and a blue polo shirt etc.), or simply because these tokens represent several different items having the same attributes (i.e. 10 identical blue shirts). With respect to rule 60 of FIG. 2, these different tokens would all be processed in prior art systems, but the results of the processing would be identical.

More specifically, in the above example, the significant inter-object constraints referred to above relate to the use of a bound and/or tested variable in a rule. Compiler 20 of FIG. 1, will recognize such significant inter-object constraints. In rule 60 of FIG. 2, the significant inter-object constraint relates to the variable <COL>, which is compared to the ^COLOR attributes of all the SHIRT class, PANTS class, TIE class and SOCKS class data elements. The equivalence classes generated are: all SHIRT class data elements having the same value in the ^COLOR attribute, all PANTS class data elements having the same value in the ^COLOR attribute, all TIE class data elements having the same value in the ^COLOR attribute and all SOCKS class data elements having the same value in the ^COLOR attribute. Then single tokens representing each such equivalence class are processed by the TREAT-net or RETE-net. Finally, when a combination of equivalence classes is selected causing the rule to fire, the members of each equivalence class in the selected token in the conflict set is evaluated, and one member from each is selected to form the combination of data elements which is considered to have caused the rule to fire. This is called mapping back the equivalence classes to the data elements.

In addition, for rule based expert systems in particular, there is no need to maintain a complete list of combinations of data elements satisfying the rules. Instead, only the single set, representing the "best" combination (determined in a known manner) need be maintained for each combination of equivalence classes in the conflict set. This represents a savings in the amount of memory needed to maintain the conflict set.

BRIEF DESCRIPTION OF THE DRAWINGS

The improvements of the present invention over the prior art and the advantages resulting therefrom will become more apparent upon reading the following description of the preferred embodiments and referring to the drawings in which:

FIG. 2 is a textual diagram representative of a rule used in the system of FIG. 1;

FIG. 7 is a diagram of a RETE-net representation of the rule in FIG. 2 in accordance with the present invention, further illustrating the contents of memories associated with selected nodes in the RETE-net.

DESCRIPTION OF THE PREFERRED EMBODIMENTS

Figure 5:
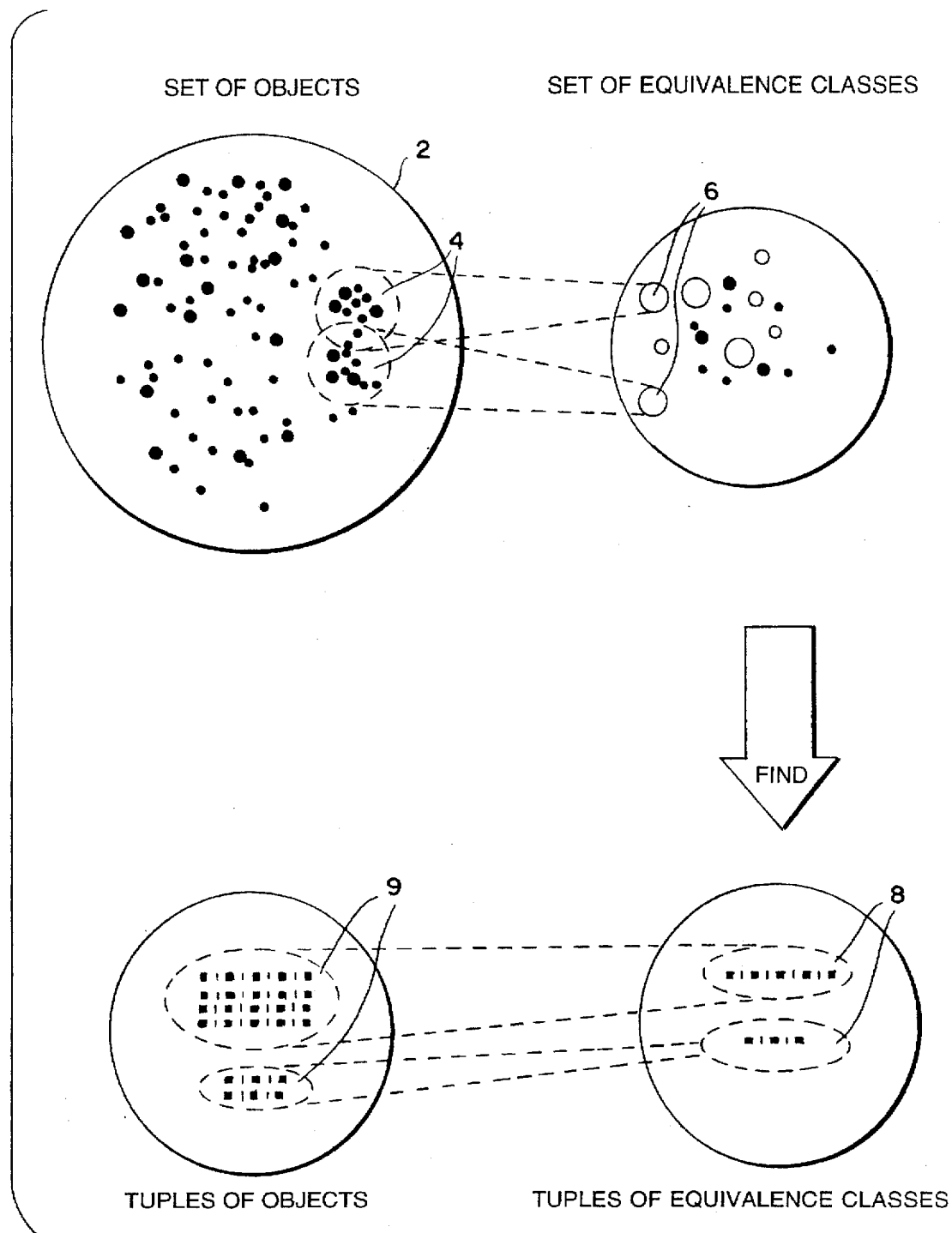
FIG. 5 is a schematic representation of the method in accordance with the present invention.

FIG. 5 is a schematic illustration of the method of finding a set of tuples of objects from a general set of those same objects that satisfy a given set of constraints in accordance with the present invention. The method begins with a given set of objects 2. Significant inter-object constraints 4 are then identified from a given set of constraints (as described in more detail below). A set of equivalence classes 6 from the set of objects 2 is generated based on the significant inter-object constraints 4. An equivalence class is a set of objects that, for the purposes of a complex data base query (such as joins over a non-key field) in a date base system, or matching in a particular rule in a rule based expert system, are indistinguishable and completely interchangeable with respect to the data base join being performed or rule being evaluated, respectively. The equivalence classes 6 themselves (and not the individual members of that equivalence class) are then evaluated to find a set of tuples of equivalence classes 8 whose members all satisfy the set of constraints (also described in more detail below). Finally, the set of tuples of equivalence classes 8 are mapped back to the set of real objects 2 to find the set of tuples of real objects 9 from the set of real objects 2 that satisfy the set of constraints.

In rule based expert systems using TREAT-nets or RETE-nets, significant constraints are identified by determining attributes of data elements which are compared to attributes of other data elements. Such constraints may be identified by either of two methods. First, if an attribute of a data class is bound to a variable in one condition of a rule, and that variable is used as a tested variable in another condition of that rule, that attribute of that data class is deemed a significant constraint, or a significant attribute. Second, if an attribute of a data class is tested against a variable which is previously bound in another condition of that rule, that attribute is also deemed a significant constraint, or a significant attribute.

Similarly in data base system queries, a significant constraint can be identified where a non-key field from one table is being compared to a field from another table in a join expression.

Figure 6:
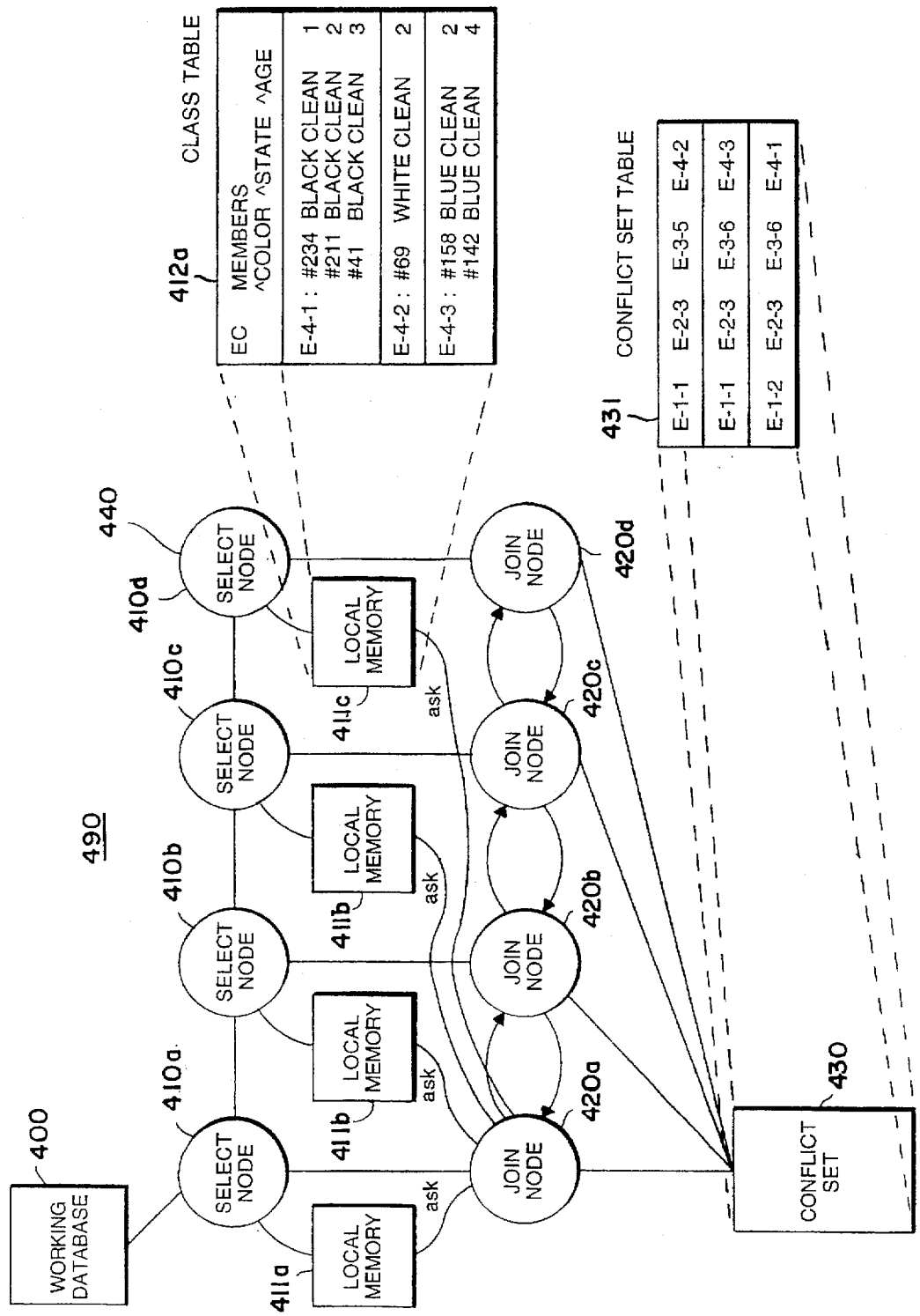
FIG. 6 is a data flow diagram of a TREAT-net representation of the rule in FIG. 2 in accordance with the present invention, further illustrating the contents of memories associated with selected nodes in the TREAT-net.

FIG. 6 is a data flow diagram of a TREAT-net 490 operating in accordance with the present invention. In FIG. 6, the TREAT node is arranged in the same manner as that in FIG. 3. Unless specifically described, the select nodes 410a–410d and the join nodes 420a–420d operate in the same manner as the corresponding select and join nodes in FIG. 3, and will not be described in detail below. As in FIG. 3, select node 410d evaluates all tokens supplied to its input port by select node 410c and further processes only those tokens representing SOCKS class data elements. All such tokens are stored in its associated local memory 411d. However, those tokens stored in local memory 411d of select node 110d are stored in an equivalence class table 412d.

Each entry in the equivalence class table 412d consists of an equivalence class number (EC), which identifies that equivalence class; and members associated with that equivalence class. The equivalence class number EC may be generated by any standard hash algorithm based on some significant attribute for which the corresponding select node is testing. Members of any equivalence class consist of an ID number (designated with a "#" prefix in equivalence class table 412d), which identifies that member, and attributes associated with the member identified by that ID number. The attribute information of the members of the equivalence class table is generated from the corresponding information from the data element contained in each token selected by that select node.

In the case of select node 410d, the significant attribute of the SOCKS class data elements in rule 60 (of FIG. 2) is ^COLOR. This can be determined because the ^COLOR attribute is bound to a variable <COL> in the condition on line 70 of rule 60, and the variable <COL> is tested in another condition of rule 60 (lines 72–76). Therefore, for each uniquely valued ^COLOR attribute in the SOCKS class data elements, there will be a unique equivalence class identified by a corresponding equivalence class number EC. Associated with each unique equivalence class will be the set of attributes (^COLOR, ^STATE {clean or dirty} and ^AGE) of each data element from the working data base represented by the tokens that have passed the test of select node 410d.

If the first token of the SOCKS class passing through select node 410d has a ^COLOR attribute having the value black (representing a pair of black socks), an equivalence class number, for example, E-4-1 in equivalence class table 412d, is created for all data elements representing black socks, regardless of the values of the other attributes of the SOCKS class data elements. In addition, an ID number is created, for example, #234 in the example of FIG. 6, that associates a clean black pair of socks that is 1 year old with the equivalence class number E-4-1. Because a new equivalence class has been created, a token representing equivalence class E-4-1 is passed to join node 420d.

If the next token passing through select node 410d also represents a pair of black socks, a new equivalence class number is not generated because a black socks equivalence class number already exists, i.e., E-4-1 in the example. Instead, a new ID number, i.e., #211, is created that associates a clean pair of black socks that is 2 years old with the equivalence class number E-4-1. Within an equivalence class, members of that equivalence class may be stored as a standard linked list, as shown in class table 412d (thereby minimizing storage requirements) or they may be stored in a hash table based on their ID numbers (thereby minimizing the search time required to remove members). Because no new equivalence class was created, no token is passed to join node 420d in this case.

If the next token passing through select node 410d represents a pair of white socks, a new equivalence class number E-4-2 is created for all data elements that represent white socks. In the equivalence class table 412d, EC E-4-2 is created for data elements representing white socks. This token then has an ID number assigned to it, i.e., #69 in the current example, and becomes an entry which is associated with the clean pair of white socks that are 2 years old. A token representing the newly created equivalence class E-4-2 is passed to join node 420d. If the next token passing through select node 410d represents a pair of black socks, a new equivalence class number need not be created because E-4-1 already exists for black socks. This new element will be associated with EC E-4-1 and have an ID number #41. This entry represents a clean pair of black socks that are three years old. No token is passed to join node 420d.

If the next token passing through select node 410d represents a pair of blue socks, a new equivalence class number EC E-4-3 is created for all data elements that represent blue socks. In the equivalence class table 412d EC E-4-3 is created for blue socks. This token then has an ID number created, i.e., #158 in the current example, and becomes associated with the clean pair of blue socks that are 2 years old. A token representing newly created equivalence class E-4-3 is passed to join node 420d.

This process of creating new equivalence classes for data elements having uniquely valued significant attributes, assigning each of the data elements an ID number and associating the data element to its corresponding equivalence class and passing tokens representing newly created equivalence classes to subsequent join nodes continues until there are no more tokens passing through select node 410d.

It is also possible for data elements to be deleted, in a known manner. If a data element is deleted, a token representing that data element is passed through the TREAT-net 490 having the same information, but with an indicator that this data element is to be deleted. If such a token is passed by select node 410*d*, and it refers to an entry in equivalence class table 412*d*, then that entry is deleted from the equivalence class table 412*d*.

For example, if select node 410*d* passed a delete token representing the data element having the ID number #41 in equivalence class E-4-1, then that data element is deleted from equivalence class table 412*d*. If select node 410*d* passed a delete token representing the data element having the ID number #69 in equivalence class E-4-2, then not only will that data element be deleted from the equivalence class table, but that equivalence class, itself, will be deleted. In addition, the entries in the conflict set in result node 430 referring to this equivalence set will also be deleted, in a known manner. Deletion of data elements will be discussed further below.

Select nodes 410*a*–410*c* operate in a similar manner to store data elements that pass their respective tests in their associated memories 411*a*–411*c* as equivalence class tables. Then, rather than passing tokens representing matching data elements to respective join nodes 420*a*–420*d*, only tokens representing matching equivalence class numbers ECs are passed.

Figure 1:
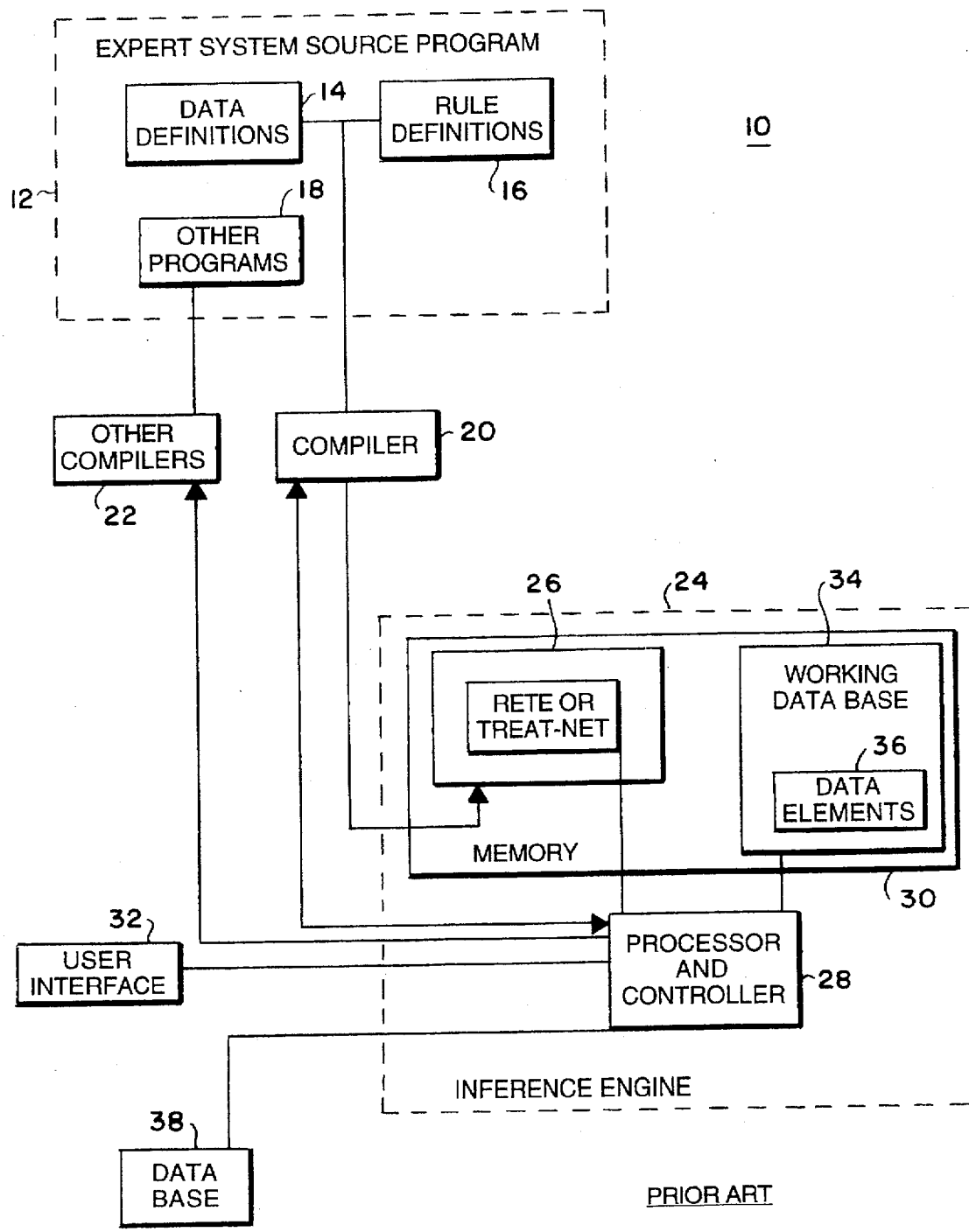
FIG. 1 is a functional block diagram of computer system implementing an expert system.
Figure 3:
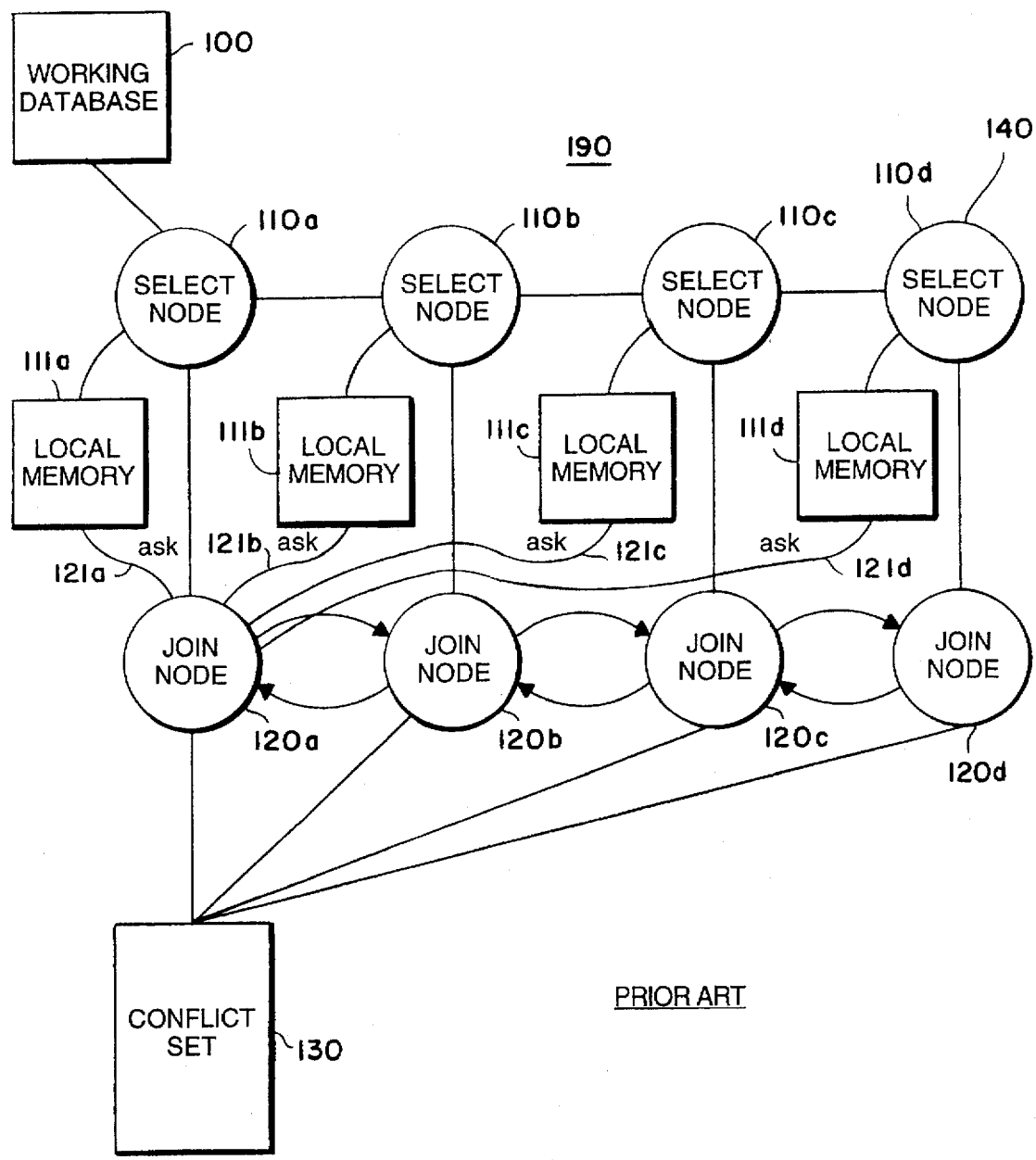
FIG. 3 is a data flow diagram of a TREAT-net representation of the rule of FIG. 2.

The join nodes 420*a*–420*d* act in a similar manner as join nodes 120*a*–120*d* in FIG. 3, but instead of passing data packet for evaluating attributes of individual data elements represented by the tokens passed to them (as in FIG. 3), they pass data packets for evaluating the significant attributes of the equivalence classes represented by the tokens passed to them. Tokens representing combinations of equivalence classes having significant attributes which satisfy the test corresponding to TREAT-net 490 are then passed on to the result node 430 to become members of the conflict set 431. The conflict set 431 contained in result node 430 then contains a set of tokens representing combinations of equivalence classes having significant attributes whose values satisfy the rule corresponding TREAT-net, and not combinations of individual data elements having attributes whose values satisfy the rule. Further processing of the tokens in the conflict set 431 will be described in detail below.

FIG. 7 is a data flow diagram of a RETE-net 390 corresponding to rule 60 of FIG. 2 in accordance with the present invention. In FIG. 7, unless otherwise described below, elements corresponding to those in FIG. 4 operate in a similar manner, and will not be described in detail below. In FIG. 7, all tokens received by 1-input node 310*d* are stored in its associated memory 311*d*. However, the data elements stored in memory 311*d* of 1-input node 310*d* are stored in an equivalence class table 312*d*. Each entry in equivalence class table 312*d* consists of an equivalence class number EC, and members associated with the equivalence class number. Members of the equivalence class table consist of an ID number and attributes (^COLOR, ^STATE {clean or dirty} and ^AGE) of the data element corresponding to that ID number. The equivalence class number may be generated by any standard hash algorithm based on the significant attribute for which the corresponding 1-input node is testing.

In the case of 1-input node 310*d*, the significant attribute (determined as described above) of the SOCKS class data elements is ^COLOR. Therefore, for each SOCKS class data element having a uniquely valued ^COLOR attribute (representing a uniquely colored pair of socks), there will be a unique equivalence class identified by an EC number. Associated with each unique equivalence class will be the attributes of actual data elements contained in tokens that have passed the test of the corresponding 1-input node 310*d*.

Continuing with the socks example, if the first token passing through 1-input node 310*d* represents a data element of the SOCKS class with a ^COLOR attribute having the value black (representing a pair of black socks), an equivalence class number EC, for example, E-4-1 in equivalence class table 312*d*, is generated for data elements representing black socks. In addition, an ID number is created, for example, #234 in FIG. 7, and the attributes from the current token are copied into that entry in the equivalence class table. This associates a clean pair of black socks that is 1 year old with the equivalence class number E-4-1. Because a new equivalence class was created, a token representing newly created equivalence class E-4-1, and including the value of the significant attribute of that equivalence class, is passed to 2-input node 320*c*. (The other, non-significant, attributes are not included in the token representing the equivalence class. If these attributes are needed for a data element which is a member of that equivalence class, they may be retrieved from the appropriate equivalence class table entry representing that data element.)

If the next token passing through 1-input node 310*d* represents another pair of black socks, a new equivalence class number is not generated because a black sock equivalence class number already exists, i.e., E-4-1 in the example. A new ID number, i.e., #211, is created for that token, and the attributes of the data element contained in the token is copied to that entry in the equivalence class table. This associates a clean pair of black socks that is 2 years old with the equivalence class number E-4-1. Within an equivalence class, members of that equivalence class may be stored as a standard linked list, as shown in class table 412*d* (thereby minimizing storage requirements) or they may be stored in a hash table based on their ID numbers (thereby minimizing the search time required to remove members). In this case, no token is passed to 2-input node 320*c*.

If the next token passing through 1-input node 310*d* represents a pair of white socks, a new equivalence class number E-4-2 is created for all data elements that represent white socks. In the equivalence class table 312*d* equivalence class number EC E-4-2 is created for data elements representing white socks. The equivalence class table entry representing the first pair of white socks then has an ID number created, i.e., #69 in the current example, and that entry becomes associated with the clean pair of white socks that are 2 years old represented by the current token. A token representing newly created equivalence class E-4-2 is passed to 2-input node 320*c*. If the next token passing through 1-input node 310*d* represents a pair of black socks, a new equivalence class number need not be created because E-4-1 already exists for black socks. This new data element will be associated with E-4-1 and have an ID number #41. This represents a clean pair of black socks that are three years old. Again, no token is passed to 2-input node 320*c*.

If the next token passing through 1-input node 310*d* represent a pair of blue socks, a new equivalence class number E-4-3 is created for all data elements representing blue socks. In the equivalence class table 312*d* equivalence class number EC E-4-3 is created for data element representing blue socks. The first data element representing a pair of blue socks then has an ID number created, i.e., #158 in the current example, the attributes of that data element are stored in that entry and that entry becomes associated with the clean pair of blue socks that are 2 years old. A token representing newly created equivalence class E-4-3 is passed to 2-input node 320*c*.

This process of creating new equivalence classes for data elements having uniquely valued significant attributes, associating each of the data elements via an ID number to its corresponding equivalence class and passing tokens representing newly created equivalence classes to subsequent 2-input nodes continues until there are no more tokens passing through 1-input node 310d. Deletion of data elements from the equivalence class tables in RETE-net 390 is processed in the same manner as in the TREAT-net 490 (of FIG. 6), except that delete tokens representing equivalence classes that have been deleted are passed to subsequent 2-input nodes.

The 1-input nodes 310a–310c operate in a similar manner to store data elements passing the respective tests performed by that 1-input node in the local memories 311a–311c as entries in respective equivalence class tables. Then, rather than passing individual tokens representing matching corresponding data elements to respective 2-input nodes 320a–320c, only tokens representing newly created equivalence class numbers EC are passed.

Figure 4:
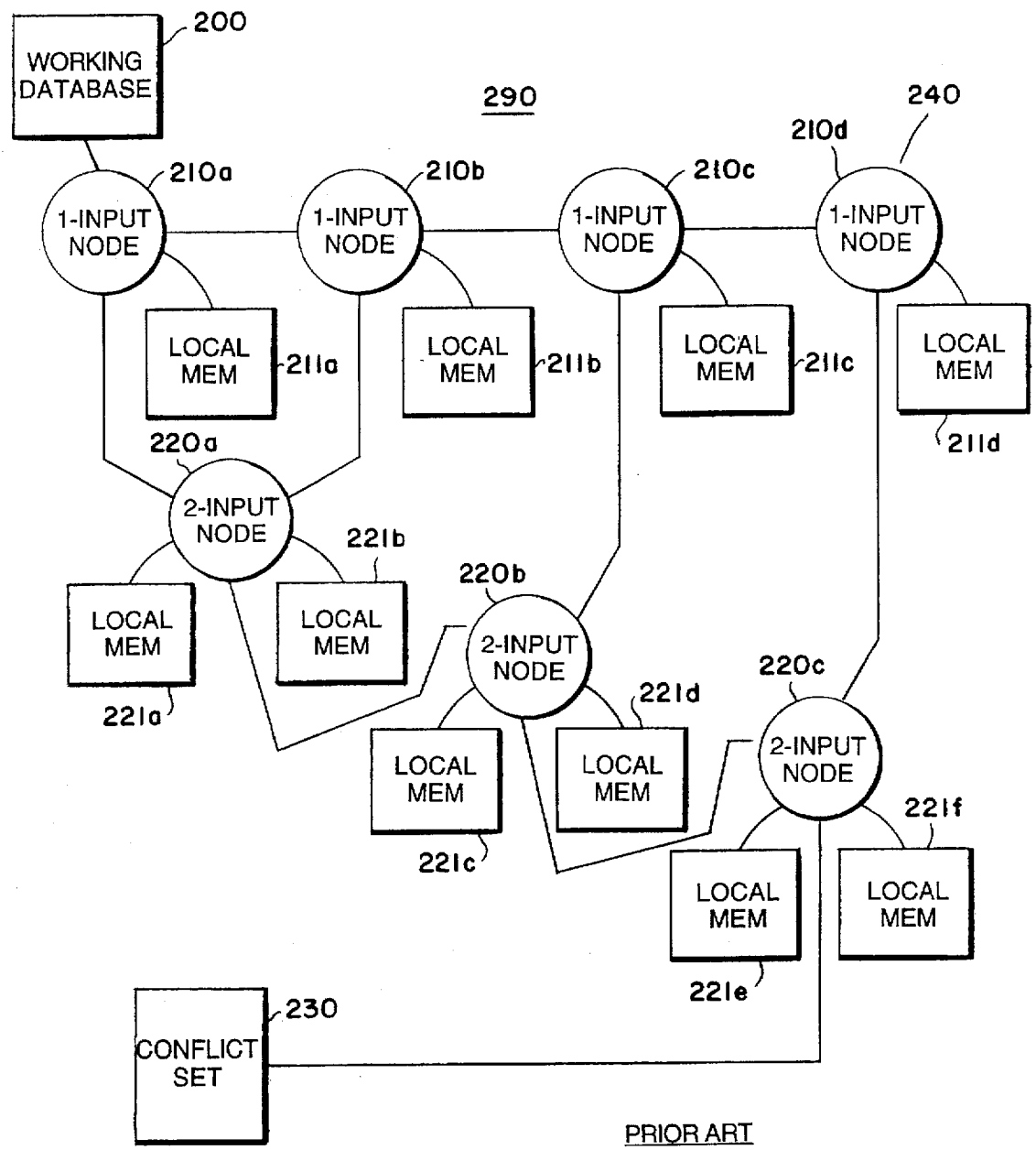
FIG. 4 is a data flow diagram of a RETE-net representation of the rule of FIG. 2.

In general, tokens representing equivalence classes, or sets of equivalence classes, are received at left hand input ports of 2-input nodes, and tokens representing individual equivalence classes are received at right hand input ports of 2-input nodes in the same manner as tokens representing data elements or sets of data elements are received in the prior art 2-input nodes illustrated in FIG. 4. These tokens are also processed by the 2-input nodes in a similar manner: comparing the significant attributes of the equivalence class represented by the token newly received at one input port to the significant attributes of the equivalence classes represented by the respective tokens previously stored in the memory associated with the other input port. If the significant attributes pass the tests performed by that 2-input node, a token is generated representing the combination of the equivalence classes in the two matching tokens.

As an example, tokens representing equivalence class numbers E-4-1, E-4-2, E-4-3 from equivalence class table 312d in local memory 311d of 1-input node 310d are passed to the right hand input port of 2-input node 320c and stored in the right hand memory 321f in a similar manner as tokens representing data elements are stored in the RETE-net 290 of FIG. 4. As they are received, these tokens are compared to all the tokens representing the combinations of equivalence classes previously received from 2-input node 320b and stored in the left hand memory 321c. As pairs of tokens satisfying the test of 2-input node 320c are found, tokens representing the combination of equivalence classes of the two matching tokens are generated and passed to the result node 330 to be placed in the conflict set. The conflict set in result node 330 then contains a set of tokens representing combinations of equivalence classes whose significant attributes satisfy the rule corresponding to the RETE-net 390, and not combinations of individual data elements whose attributes satisfy the rule.

The further processing of conflict sets 431 in the TREAT-net 490 of FIG. 6, and 332 in the RETE-net 390 of FIG. 7 will be described below. In order to simplify the explanation, only the conflict set 332 in the RETE-net 390 of FIG. 7 will be discussed below, but this discussion applies to the processing of both conflict sets unless stated otherwise.

Each token passed to result node 330 does not represent a single set of data elements satisfying the conditions of the rule, but instead represents a set of equivalence classes whose significant attributes satisfy the conditions of the rule. As described above, each equivalence class may have a plurality of actual data elements which belong to it.

When a token is received in result node 330 to be placed in the conflict set 332, the equivalence classes identified in that token (e.g. E-1-1, E-2-3, E-3-5 and E-4-2) are evaluated, in accordance with well known methods, to select the "best" combination of data elements belonging to the respective equivalence classes, which has not previously been used to fire that rule. This may be done by using the respective equivalence class numbers EC contained in the selected token in the conflict set to access the respective equivalence class tables holding the actual data elements which are members of those equivalence classes. (This will be discussed in more detail below.) Both the equivalence class identifiers, and the best unused combination of data elements belonging to the respective equivalence classes are stored in each token stored in the conflict set.

The data element combinations in each token in the conflict set 332 are evaluated, also in accordance with well known methods, to select the "best" such combination, which then is deemed to cause the rule to fire. After a rule is selected to be fired, but before it is actually fired, the next best unused combination of data elements from the respective equivalence classes contained in the selected token from the conflict set 332 is determined. If such a combination exists, those data elements replace the combination of data elements deemed to have fired the rule in that conflict set token.

If no such combination exists, this conflict set token is marked inactive. When a new data element is received in any of the equivalence class tables referred to by this conflict set token, then this conflict set token is made active again, and the above process is repeated.

In order to maintain the best unused combination of data elements associated with each conflict set token, each equivalence class, in the respective equivalence class tables, maintains a list of the conflict set tokens containing references to that equivalence class. Whenever a new data element is added to an equivalence class, because it is new and therefore may be better (in accordance with the above mentioned known selection method), the best unused combination of data elements associated with every conflict set token containing this equivalence class is reevaluated to determine whether it need be updated to include this new data element. Similarly if a member of an equivalence class is removed then every conflict set token containing this eguivalence class must be checked. If its best unused combination does not refer to the data element being deleted then nothing needs to be done. If its best unused combination includes the data element being deleted then the best unused combination must be reevaluated to determine whether it need be updated to include this new data element.

In the prior art RETE-net of FIG. 4, after a rule has fired, the token in the conflict set representing the combination of data elements deemed to have caused the rule to fire would then be deleted from the conflict set This was sufficient to indicate that that combination of data elements had been used, and was no longer eligible to fire that rule. In RETE-net 390 according to the present invention, after the rule has fired, the token in the conflict set deemed to have caused the rule to fire cannot be deleted because there may still be unused data elements in the equivalence class tables. However, the data elements which have previously been deemed to have caused the rule to fire must be made ineligible to fire the rule again.

This is done by maintaining a refraction set 335. The refraction set 335 is a list of which specific data elements have previously been deemed to have fired the rule. After a token in the conflict set 332 has been selected, an entry is added to the refraction set 335 which indicates the combination of data elements used to fire this rule.

The selection process for determining the best unused combination of data elements corresponding to a conflict set token involves accessing all the equivalence class tables associated with this conflict set token. Then the best combination of data elements is selected in accordance with the above mentioned known selection method. The refraction set 335 is then checked to determine whether this combination has previously been used to fire this rule. If that combination of data elements is present in the refraction set, then the equivalence class tables are rechecked to select the next best combination of data elements. This too is checked against the entries in the refraction set 335. This is repeated until an unused combination of data elements is found and placed in the corresponding conflict set token, or no such combinations of data elements are found, in which case the conflict set token is marked inactive, as discussed above. This process may be performed to evaluate every combination of data elements in the respective equivalence classes, or may be performed on an incremental basis to test for the next best combination of data elements.

While there has been shown and described a preferred embodiment, it is to be understood that various other adaptations and modifications may be made within the spirit and scope of the invention.

What is claimed is:

1. A method of rule execution for an expert system comprising the steps of:

storing a plurality of objects in a database stored in a computer memory;

inputting a set of constraints to the computer memory, the set of constraints mapping to a plurality of rules stored in the computer memory;

identifying a plurality of inter-object constraints among the plurality of objects in the database;

generating a set of equivalence classes from the plurality of objects in the database in accordance with the inter-object constraints, the set of equivalence classes including an equivalence class number and a table having objects associated with the equivalence class number, the equivalence class number being generated by a hashing technique contained in the computer memory;

grouping the set of equivalence classes into a plurality of subsets, each of the subsets being mapped to one of the plurality of rules contained in the computer memory; and executing each of the plurality of rules in the computer memory that is mapped to one of the subsets.

2. A method of grouping database objects comprising the steps of:

storing a database in a computer memory, the database containing a plurality of database objects;

inputting a set of constraints to the computer memory;

identifying significant constraints from the set of constraints;

generating equivalence classes from the plurality of database objects based on the significant constraints, each of the equivalence classes including an equivalence class number and a table having database objects associated with the equivalence class number, the equivalence class number being generated by a hashing technique contained in the computer memory;

evaluating the equivalence classes to find a combination of equivalence classes whose associated database objects all satisfy the set of constraints; and mapping the combination of equivalence classes back to the plurality of database objects to find a tuple of database objects from the plurality of database objects that satisfy the set of constraints.

* * * * *